(12) United States Patent
Schmidt et al.

(10) Patent No.: US 8,899,965 B2
(45) Date of Patent: Dec. 2, 2014

(54) MOLD ARRANGEMENT HAVING A MELT DISTRIBUTION MANIFOLD WITH A HINGED JOINT

(71) Applicant: Mold Hotrunner Solutions Inc., Georgetown (CA)

(72) Inventors: Harald Schmidt, Georgetown (CA); Evan Goodwin, Georgetown (CA)

(73) Assignee: Mold Hotrunner Solitions Inc., Georgetown (CA)

( * ) Notice: Subject to any disclaimer, the term of this patent is extended or adjusted under 35 U.S.C. 154(b) by 24 days.

(21) Appl. No.: 13/909,438

(22) Filed: Jun. 4, 2013

(65) Prior Publication Data

US 2013/0259969 A1 Oct. 3, 2013

Related U.S. Application Data

(63) Continuation of application No. PCT/CA2011/050782, filed on Dec. 19, 2011.

(60) Provisional application No. 61/425,075, filed on Dec. 20, 2010.

(51) Int. Cl.

| | |
|---|---|
| *B29C 45/22* | (2006.01) |
| *B29C 45/27* | (2006.01) |
| *B29C 45/74* | (2006.01) |
| *B29C 45/32* | (2006.01) |
| *B29L 31/00* | (2006.01) |

(52) U.S. Cl.
CPC ............ *B29C 45/74* (2013.01); *B29L 2031/712* (2013.01); *B29C 45/2725* (2013.01); *B29C 2045/2717* (2013.01); *B29C 45/322* (2013.01)
USPC .......................................... 425/572; 425/588

(58) Field of Classification Search
CPC ............ B29C 45/74; B29C 2045/2717; B29C 45/322
USPC .................................................... 425/572, 588
See application file for complete search history.

(56) References Cited

U.S. PATENT DOCUMENTS

| | | | |
|---|---|---|---|
| 4,129,323 A | * | 12/1978 | Wilson ........................... 285/69 |
| 4,212,626 A | | 7/1980 | Gellert |
| 4,292,018 A | * | 9/1981 | Beale ............................ 425/572 |
| 4,702,689 A | | 10/1987 | Schmidt |

(Continued)

FOREIGN PATENT DOCUMENTS

WO 2006039780 A1 4/2006

*Primary Examiner* — Tim Heitbrink
(74) *Attorney, Agent, or Firm* — McMillan LLP

(57) ABSTRACT

A melt distribution manifold for use with first and second mold portions moveable with respect to each other, the melt distribution manifold including a melt inlet means for receiving melt from an injection molding machine, a first manifold portion connected to the first mold portion, wherein the first manifold portion is stationary with respect to the first mold portion, a second manifold portion connecting the first manifold portion to the hot runner nozzle, wherein the second manifold portion is moveable with respect to the first manifold portion such that when the first mold portion moves with respect to the second mold portion, the second manifold portion remains connected to the first manifold portion and to the hot runner nozzle, a hinged joint connecting the first manifold portion to the second manifold portion. Each of the first manifold portion, the second manifold portion, and the hinged joint having respective melt distribution bores in fluid communication with each other.

18 Claims, 13 Drawing Sheets

(56) References Cited

U.S. PATENT DOCUMENTS

| | | | |
|---|---|---|---|
| 4,786,246 A * | 11/1988 | Gellert | 425/588 |
| 4,810,184 A * | 3/1989 | Gellert et al. | 425/572 |
| 4,981,431 A * | 1/1991 | Schmidt | 425/588 |
| 5,011,646 A | 4/1991 | Bertschi | |
| 5,069,615 A | 12/1991 | Schad | |
| 5,484,275 A | 1/1996 | Kushnir | |
| RE35,256 E | 5/1996 | von Buren | |
| 5,522,720 A | 6/1996 | Schad | |
| 5,804,231 A | 9/1998 | Prophet | |
| 5,910,327 A | 6/1999 | Schad | |
| 6,015,283 A * | 1/2000 | Mattia | 425/588 |
| 6,851,946 B1 | 2/2005 | Plass | |
| 6,955,534 B2 | 10/2005 | Dewar | |
| 7,122,145 B2 | 10/2006 | Olaru | |
| 7,284,979 B2 | 10/2007 | Mai | |
| 7,614,869 B2 | 11/2009 | Babin | |
| 7,775,788 B2 | 8/2010 | Fairy | |
| 7,862,321 B2 | 1/2011 | Rozema | |
| 2006/0286197 A1 | 12/2006 | Manda | |
| 2007/0193713 A1 | 8/2007 | Manda | |
| 2008/0193585 A1 | 8/2008 | Glaesener | |

\* cited by examiner

MOLD ARRANGEMENT HAVING A MELT DISTRIBUTION MANIFOLD WITH A HINGED JOINT

RELATED APPLICATIONS

This application is a continuation of PCT/CA2011/050782 filed Dec. 19, 2011, which claims priority from U.S. Provisional Application No. 61/425,075 filed Dec. 20, 2010, the contents of which, in their entirety, are herein incorporated by reference.

FIELD OF THE INVENTION

The invention relates to the field of hot runner systems and assemblies for injection molding systems, and more specifically, to a mold hot runner manifold assembly incorporating hinged joints.

BACKGROUND OF THE INVENTION

Prior art injection molding assemblies, for the manufacture of thin-walled containers, or similar items have previously been restricted in the size of container that can possibly be created, while maintaining the desired thin wall. Hot runner nozzles are typically positioned at a top end of the mold and melt is injected throughout the mold from this top end. This poses a difficulty with larger containers where extremely high pressure are required to inject melt to portions of the mold furthest away from the hot runner nozzles. While one solution is to provide for a thicker wall, this is not always feasible. In order to expand beyond this restriction, additional hot runner nozzles may be used, for example, positioned at side portions of the mold.

As known by those skilled in the art, where ribs or other features are to be provided on an external surface of the container, the mold includes side slide elements that provide for the external features on the container. In order to eject the container without causing damage to the external features of the container, the slide elements of the mold must move away, as a core half of the mold pulls away. Providing additional hot runner nozzles in the side portions, as discussed earlier, presents significant problems when portions of the mold are themselves moving.

Various prior art documents have attempted to address the problem of transferring melt into moving mold sections, including the slide elements discussed above, or alternatively, into tandem or stackable molds. Often times, these resulted in overly complex arrangements or requiring valves between interfaces that are prone to leakage. In other cases, the flow of melt has to be stopped when mold portions are in motion. Various other problems associated with the prior art will be evident to those skilled in the art. Various prior art patents and applications have attempted to address the problem of transferring melt into movable mold sections including Patent/Publication Numbers: U.S. Pat. No. 5,069,615 entitled "Stack Mold with Insulated Runner" published Dec. 3, 1991; U.S. Pat. No. 6,851,946 entitled "Hot Runner Distributor System" published Feb. 8, 2005; U.S. Pat. No. 7,614,869 entitled "Manifold Nozzle Connection" published Nov. 10, 2009; U.S. 2007/0193713 entitled "Transfer Of Force From Manifold To Plate Of Hot Runner" published Aug. 23, 2007; U.S. Pat. No. 7,284,979 entitled "Self Aligning Articulated Joint For Use In Hot Runner Systems" published Oct. 23, 2007; U.S. Pat. No. 5,484,275 entitled "Nozzle Construction For Triple Stack Molding Arrangement" published Jan. 16, 1996; U.S. Pat. No. 5,522,720 entitled "Injector Nozzle With Pivotally Movable Surfaces" published Jun. 4, 1996; U.S. Pat. No. 4,702,689 entitled "Side Mounted Manifold Block For Variable Orientation Of Injection Nozzle" published Oct. 27, 1987; Re. 35,256 entitled "Tandem Injection Molding Machine With Direct Feed To Molds" published May 28, 1996; U.S. Pat. No. 5,910,327 entitled "Sprue Bar Assembly For Stack Molds" filed Jun. 8, 1999; U.S. Pat. No. 5,804,231 entitled "Expandable Hot Runner Manifold" published Sep. 8, 1998; U.S. 2008/0193585 entitled "Hot Runner Interface Adaptor" published Aug. 14, 2008; U.S. Pat. No. 4,212,626 entitled "Stack Injection Molding Melt Transfer System" published Jul. 15, 1980; U.S. Pat. No. 7,775,788 entitled "Melt Transfer Components For A Stack Molding System" published Aug. 17, 2010; U.S. Pat. No. 6,955,534 entitled "Valve To Valve Melt Transfer Device" published Oct. 18, 2005; and, U.S. Pat. No. 5,011,646 entitled "Method And Apparatus For Injection Molding Using A Movable Sprue Bar" published Apr. 30, 1991.

Furthermore, the Variofill™ system sold by PSG Plastic Service GmbH discloses a system that permits variable positioning and movement of a hot runner assembly prior to functionally attaching same to a mold. However, once the hot runner is assembled into the mold, the movement of the hot runner assembly is fully constrained, and thus suffers from similar deficiencies as discussed above.

Accordingly, there is a need in the art for a hot runner manifold assembly that mitigates at least one of the aforementioned problems associated with the prior art and/or provides for improved performance in applications where there is a need for uninterrupted flow of melt between manifold portions that move with respect to each other.

SUMMARY OF THE INVENTION

There is a need in the art for an improved manifold for use in injection mold systems that allows for the uninterrupted flow of melt between manifold portions that move with respect to each other. There is a further need in the art to provide a manifold that minimizes leakage, can be produced and installed in a cost effective manner, and operates to minimize down-time of the injection mold system. There is a further need in the art to solve one or more the problems as earlier described.

According to one embodiment of the invention, there is provided a mold arrangement having a first mold portion and a second mold portion, wherein the second mold portion is moveable with respect to the first mold portion, at least one hot runner nozzle fixed in position with respect to the second mold portion, and a melt distribution manifold for distributing melt to the at least one hot runner nozzle. The melt distribution manifold preferably includes a melt inlet means for receiving melt from an injection molding machine, a first manifold portion connected to the first mold portion such that the first manifold portion is stationary with respect to the first mold portion, a second manifold portion connecting the first manifold portion to the hot runner nozzle. The second manifold portion is moveable with respect to the first manifold portion such that when the first mold portion moves with respect to the second mold portion, the second manifold portion remains connected to the first manifold portion and to the hot runner nozzle. A hinged joint connects the first manifold portion to the second manifold portion. Each of the first manifold portion, the second manifold portion, and the hinged joint include respective melt distribution bores in fluid communication with each other.

According to one aspect of this embodiment, the mold arrangement comprises one of a stack mold, a tandem mold, and a side slide mold arrangement.

According to another aspect of this embodiment, the mold arrangement includes additional moveable manifold portions connected in series to the second manifold portion by additional hinged joints.

According to another aspect of this embodiment, the hinged joint comprises a socket and bushing combination that permits the socket to rotate within the bushing; the socket attached to the first manifold portion and the bushing positioned between the socket and the second manifold portion; a clamping means for clamping the socket and the bushing between the first manifold portion and the second manifold portion.

According to another aspect of this embodiment, the clamping means comprises a clamp plate in contact with an outer surface of the second manifold portion; the clamp plate having means for receiving screws extending from the first manifold portion to the means for receiving to form a clamping connection.

According to another aspect of this embodiment, at least one of the first and second manifold portions comprises a heating element proximate the hinged joint.

According to another aspect of this embodiment, the hinged joint comprises a connector having a connecting portion and a ball bearing portion; a bearing surface formed on the first manifold portion sized and otherwise dimensioned for receiving the ball bearing portion; the connecting portion rigidly connected to the second manifold portion; and clamping means for clamping the connector to the first manifold portion to restrict lateral movement of the connector with respect to the first manifold portion while permitting rotational movement of the ball bearing portion with respect to the bearing surface.

According to another aspect of this embodiment, at least one of the first and second manifold portions comprises a heating element proximate the hinged joint.

According to another aspect of this embodiment, the hinged joint comprises a first clamp plate adjacent an outer surface of the first manifold portion and a clamp plate adjacent an outer surface of the second manifold portion, wherein the first and second clamp plates are arranged to clamp the first manifold portion and the second manifold portion therebetween with a socket and bushing combination that permits the socket to rotate within the bushing; the socket attached to the first manifold portion and the bushing positioned between the socket and the second manifold portion.

According to another embodiment of the invention, there is provided a melt distribution manifold for use with first and second mold portions moveable with respect to each other. The melt distribution manifold preferably includes a melt inlet means for receiving melt from an injection molding machine, a first manifold portion connected to the first mold portion such that the first manifold portion is stationary with respect to the first mold portion, a second manifold portion connecting the first manifold portion to the hot runner nozzle. The second manifold portion is moveable with respect to the first manifold portion such that when the first mold portion moves with respect to the second mold portion, the second manifold portion remains connected to the first manifold portion and to the hot runner nozzle. A hinged joint connects the first manifold portion to the second manifold portion. Each of the first manifold portion, the second manifold portion, and the hinged joint include respective melt distribution bores in fluid communication with each other.

According to one aspect of this embodiment, additional moveable manifold portions are connected in series to the second manifold portion by additional hinged joints.

According to another aspect of this embodiment, the hinged joint comprises a socket and bushing combination that permits the socket to rotate within the bushing; the socket attached to the first manifold portion and the bushing positioned between the socket and the second manifold portion; a clamping means for clamping the socket and the bushing between the first manifold portion and the second manifold portion.

According to another aspect of this embodiment, the clamping means comprises a clamp plate in contact with an outer surface of the second manifold portion; the clamp plate having means for receiving screws extending from the first manifold portion to the means for receiving to form a clamping connection.

According to another aspect of this embodiment, at least one of the first and second manifold portions comprises a heating element proximate the hinged joint.

According to another aspect of this embodiment, the hinged joint comprises a connector having a connecting portion and a ball bearing portion; a bearing surface formed on the first manifold portion sized and otherwise dimensioned for receiving the ball bearing portion; the connecting portion rigidly connected to the second manifold portion; and clamping means for clamping the connector to the first manifold portion to restrict lateral movement of the connector with respect to the first manifold portion while permitting rotational movement of the ball bearing portion with respect to the bearing surface.

According to another aspect of this embodiment, at least one of the first and second manifold portions comprises a heating element proximate the hinged joint.

According to another aspect of this embodiment, the hinged joint comprises a first clamp plate adjacent an outer surface of the first manifold portion and a clamp plate adjacent an outer surface of the second manifold portion, wherein the first and second clamp plates are arranged to clamp the first manifold portion and the second manifold portion therebetween with a socket and bushing combination that permits the socket to rotate within the bushing; the socket attached to the first manifold portion and the bushing positioned between the socket and the second manifold portion.

Various embodiments of the invention will be described hereinbelow with reference to the attached drawings in which:

DETAILED DESCRIPTION OF THE PREFERRED EMBODIMENTS

Embodiments of the hot runner system and manifold for use in injection molding systems as will be described in detail below allow for the uninterrupted flow of melt between manifold portions that move with respect to each other. The manifold also provides one or more of the benefits over prior art systems including minimizing leakage, cost effective production and installation, and reducing down-time of injection mold systems. Specifically, the invention discloses a hinged hot runner manifold that permits movement of the hot runners as mold portions move with respect to each other. Generally, the manifold includes at least two hinged joints that permit the melt channels within the manifold leading to the hot runner nozzles to move freely as the mold portions open and close, or otherwise move with respect to each other. That is, the manifold itself includes at least one stationary portion and at least one unrestrained portion between the stationary portion and the hot runner nozzle. The unrestrained portion permits movement of the link between the stationary portion and the hot runner nozzles to thereby permit relative movement between mold portions with the hot runner nozzle still positioned at its injection points. As will be apparent, in order to provide for a stationary portion of the manifold connected to a generally fixed hot runner nozzle by way of an unrestrained manifold portion, moveable portions requires the application of joints between the stationary portion and the unrestrained portion and between the unrestrained portion and the hot runner nozzle that permits relative movement and at the joints while permitting melt to move freely therethrough with no leakage. According to the invention, these joints are implemented as hinged joints that allow the unrestrained portion full rotational movement above the hinge. Various ways of putting the invention into practice will now be described.

Figure 1:
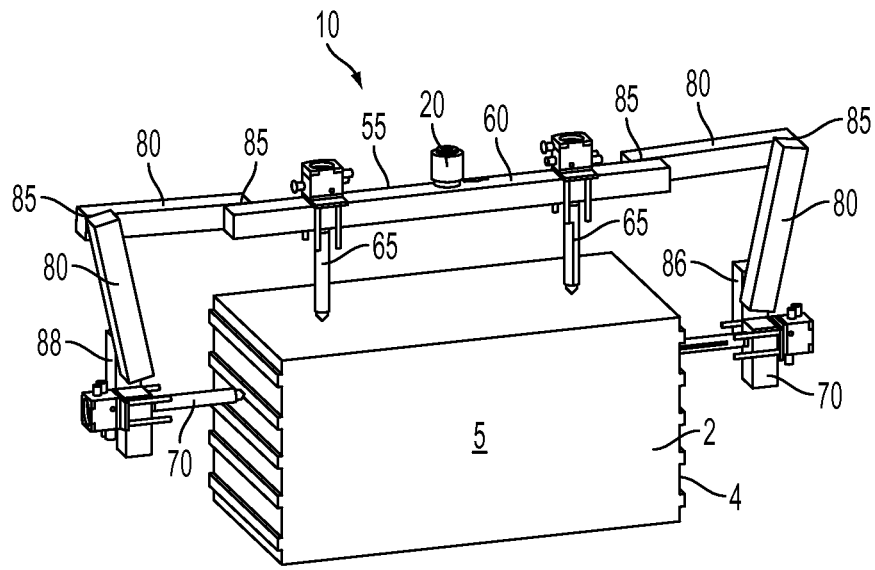
FIG. 1 is a perspective view of a melt distribution manifold in a mold closed position according to the invention.
Figure 2:
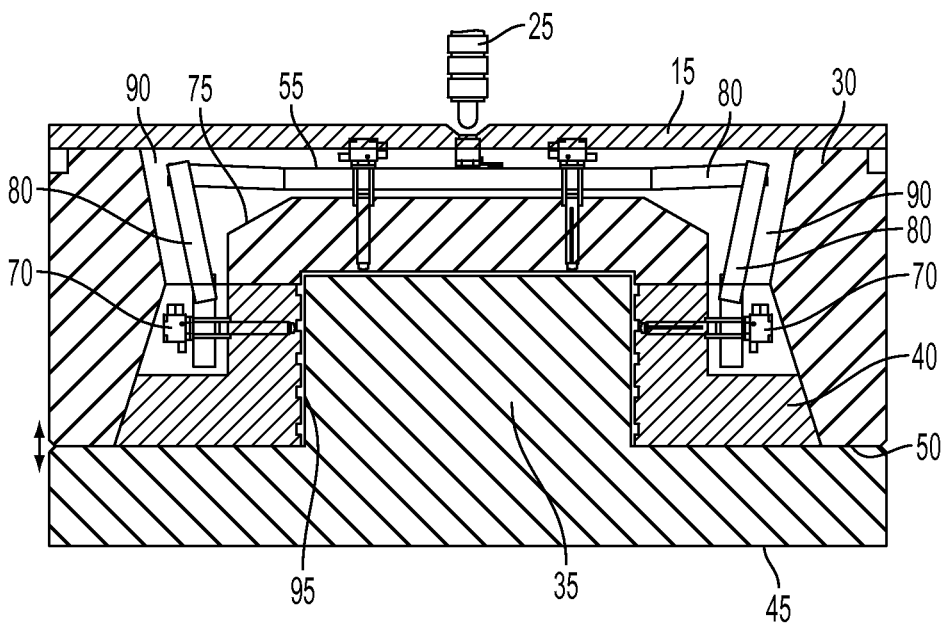
FIG. 2 is a sectional view of the melt distribution manifold of FIG. 1 as positioned in a mold, when the mold is in a mold closed position.
Figure 3:
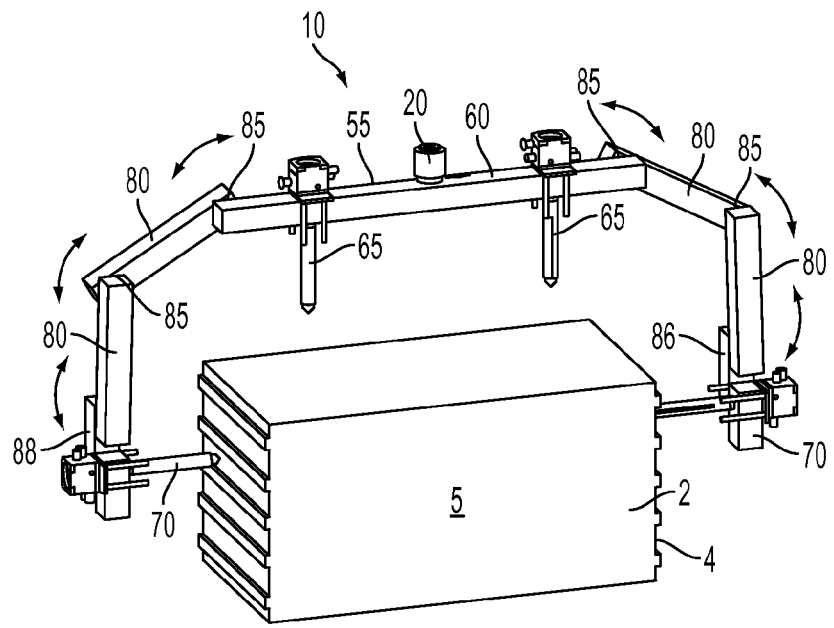
FIG. 3 is a perspective view of a melt distribution manifold in a mold open position according to the invention.
Figure 4:
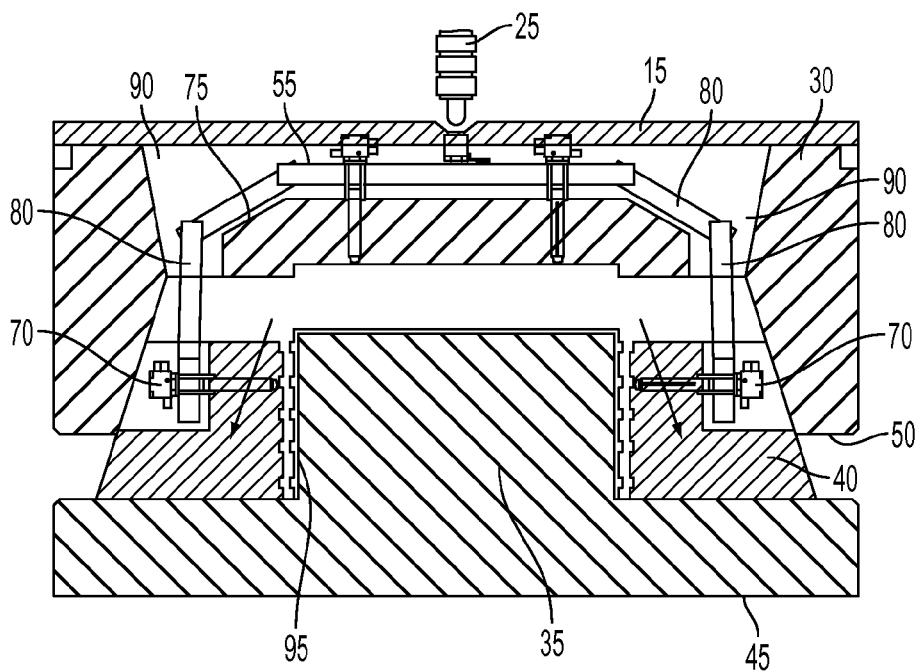
FIG. 4 is a sectional view of the melt distribution manifold of FIG. 1 as positioned in a mold, when the mold is in a mold open position.
Figure 5:
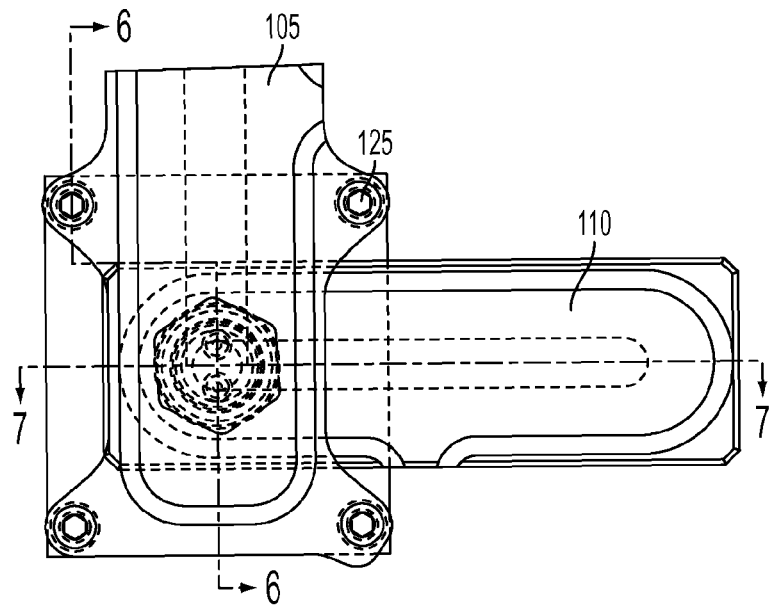
FIG. 5 illustrates one embodiment of a hinged joint for use in the mold distribution manifold according to the invention.
Figure 6:
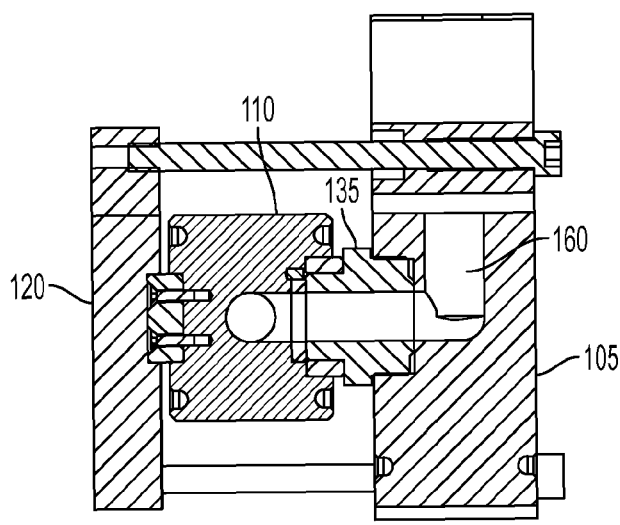
FIG. 6 is a sectional view of the joint of FIG. 5 taken along line 6-6.
Figure 7:
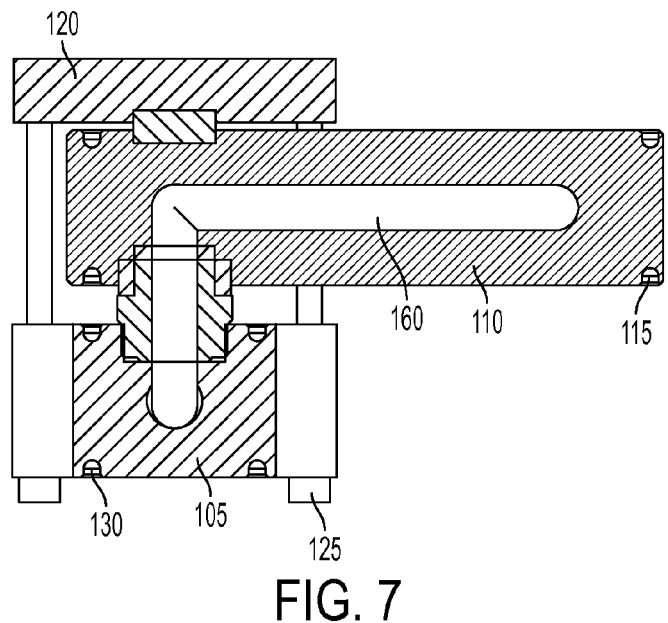
FIG. 7 is a sectional view of the joint of FIG. 5 taken along line 7-7.
Figure 8:
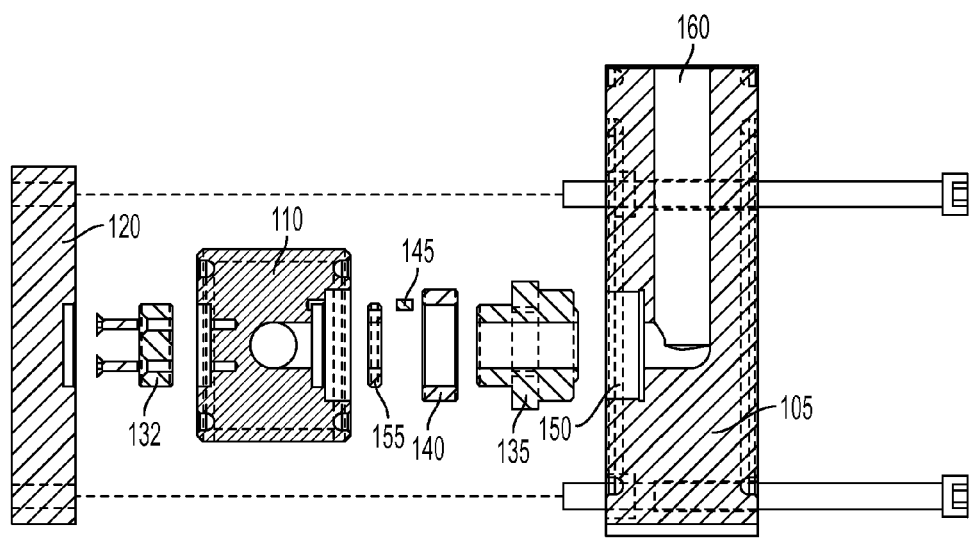
FIG. 8 is an exploded view of the joint of FIG. 5.

Referring now to FIGS. 1 and 2, there is shown a general configuration of the hinged manifold as used in a side slide a mold according to one embodiment of the invention. For ease of understanding, FIG. 1 illustrates the hinged manifold system 10 according to the invention around a container 5 to be molded, with the mold portions not shown. FIG. 2 shows a cross-section of the mold that could be used to create the container shown in FIG. 1 in a mold-closed position, that is, when melt is being injected into the mold cavity. As shown in FIG. 2, one type of mold with which the invention may be used includes a top clamp plate 15, on which a melt inlet means 20 is provided for receiving melt the injection unit 25 of an injection molding machine (not shown). Along side portions of the mold, a stationary mold cavity and main manifold retainer plate 30 is connected to the top clamp plate 15 on either side of a mold core 35. Side action slides 40 surround the mold core and are adapted to be displaced away from the mold core 35 in a horizontal direction when the container 5 is to be ejected. A mold cavity plate 75 is positioned atop the mold core 35, and is displaceable along with the top clamp plate 15. A mold arrangement as described is generally known in art and its operation, additional elements and functions is not described further herein, except insofar as its interaction with the hinged hot runner manifold as described below. In operation, the retainer plate 30 separates from a mold core plate 45 at mold parting line 50 to permit the slides 40 to be displaced. (as shown in FIGS. 3 and 4). The plastic container produced by this exemplary embodiment has flat front and back side walls 2, and ribbed or undercut left and right side walls 4. FIGS. 3 and 4 illustrate the elements of FIGS. 1 and 2, but in a mold open position. In order to permit movement of manifold portions, as will be described below, a space 90 is provided proximate the top clamp plate 15, the mold cavity plate 75 and the side action slides 40 within which the manifold according to the invention is able to move, as will be described in more detail below. The invention may be applied to other mold arrangements as well, other than the preferred illustrated embodiment, as will become apparent to a person skilled in the art. Some examples include stack and/or tandem mold arrangements that are further described below, for example, to bridge the melt across mold parting surfaces and mold split lines, respectively.

As illustrated in FIGS. 1 to 4, a melt distribution manifold 55 distributes melt to top hot runner nozzles 65 and to side hot runner nozzles 70. The top hot runner nozzles 65 are fixed within ports in the mold cavity plate 75. The side hot runner nozzles 70 are fixed within ports in the side action slides 40. Accordingly, as the mold cavity plate 75 is separated from the mold core 35, and the side action slides 40 are displaced away from the container 4 following an injection molding operation, there is also relative movement between the top hot runner nozzles 65 and the side hot runner nozzles 70, which are otherwise fixed with respect to the mold cavity plate 75 and the side action slides 40, respectively. Accordingly, the invention provides for a new hot runner manifold that permits for this relative movement, while preventing leakage of melt. In order to provide such a hot runner manifold, moveable linkages are provided that permit the manifold to adapt to the relative movement of the side hot runner nozzles 70.

The hot runner manifold 55 includes a melt inlet means 20 where melt from an injection molding machine injector 25 enters the manifold to flow under pressure to the various hot runner nozzles 65, 70. The manifold 55 preferably includes a stationary manifold portion 60 that is fixed with respect to the top clamp plate 15. The top hot runner nozzles 65 preferably receive melt from outlets in the stationary manifold portion 60. Since the side hot runner nozzles 70 are fixed with respect to the side action slides 40, but undergo movement with respect to the stationary manifold portion 60, at least one, and preferably two or more hinged manifold portions 80 connected in series from the stationary manifold portion 60 the side hot runner nozzles 70 by way of hinged joints 85. A further hinged joint 86 is optionally provided and connected to the a secondary hinged manifold portion 88 that is connected to each of the side hot runner nozzles 70, and from where melt injected into the manifold 55 exits the manifold through the side injector nozzles 70. As illustrated, there are two side hot runner nozzles 70, and the manifold is symmetric about a midpoint of the stationary manifold 60, but other orientations and implementations are contemplated. For example, only a single side hot runner nozzle may be present where injection of melt is required on one side of the mold core only. Furthermore, the arrangement may not be generally symmetric. The above-described arrangement also permits melt to flow and injection to occur while the hot runner nozzles are moving, or more specifically, while portions of the manifold are moving with respect to each other.

In operation, the manifold 55 permits the side hot runner nozzles 70 to move with respect to the stationary manifold portion, even though movement of the side hot runner nozzles 70 is itself constrained by the side action slides 40. This is illustrated by comparing FIGS. 1 and 2 with FIGS. 3 and 4 which show the mold arrangement as described above in mold open and mold closed positions, respectively. In the mold closed position of FIGS. 1 and 2, the slides 40 fully engage the mold cavity 95, and the mold cavity plate 75 engages a top portion of the mold cavity 95. Melt is distributed through the inlet means 20 and via the respective stationary 60 and hinged 80 manifold portions to each of the hot runner nozzles 70. Melt then enters the cavity 95, as is known the art. Details of the injection molding process, type of melt, operation time and other functions required to produce the container are not described in further detail as these are well known in the art.

Once the desired amount of melt has been injected into the cavity 95, the slides 40 are displaced with respect to the cavity 95 and the mold cavity plate 75 is lifted away from the mold core This allows the container to be pushed off the mold core 35 and to be ejected from the mold. As shown in the mold open position of FIGS. 3 and 4, the hinged manifold portions 80 move related to each other, relative to the stationary portion 60 of the manifold 55, and relative to the mold such that the side hot runner nozzles 70 are always maintained in position and embedded within the slides 40. This relative movement of these manifolds allows for a single injection point on each side of the mold core 35 and for the provision of side hot runner nozzles 70, embedded in moveable slides 40, as has heretofore been unknown in the prior art. This arrangement is particularly useful for the production of long-length walls in thin-walled containers.

In order to put the invention as described above into practice, the provision of hinged joints 80 that permit the relative rotational movement of adjacent manifold portions, while maintaining an uninterrupted flow path for melt and preventing leakage of melt under normal operations is desirable. Accordingly, applicant has provided for various embodiments of hinged joints that may be applied to the manifold as described above. While the invention is not limited to the particular embodiments of the hinged joints as herein described, some embodiments, as will become evident in view of their description below, provides specific advantages when used in combination with the manifold herein described.

Referring now to FIGS. 5-8, there is shown an exemplary hinged joint including for connecting respective manifold portions 105 and 110 that are able to undergo rotational movement with respect to each other. The first manifold portion 105 and the second manifold portion 110 are each provided with a manifold heater 115 and 130, respectively, that is preferably an electrically heated element. The manifold heaters 115, 130 act to maintain the elevated melt temperatures as melt passes through the joint. First manifold portion 105 is secured to the joint by a hinge clamp plate 120 via clamp screws 125. Second manifold portion 110 is clamped between a hinge disc 132 extending from the hinge clamp 120 and, a socket 135 and bushing 140 combination around which relative rotation between the manifold portions 105, 110 occurs. The socket 135 includes respective inlet and outlet portions of a central bore allowing for a sealed connection on respective sides interfacing with the first manifold portion 105 and the second manifold portion 110, while maintaining an uninterrupted fluid path for melt to flow through when the first manifold portion 105 and the second manifold portion 110 are moving with respect to each other. Bushing 140 is preferably fixedly connected to the second manifold portion 110, for example by way of dowel pin 145. Socket 135 is fixedly connected to the first manifold portion 105, preferably by way of a threaded bore 150 provided on an engaging surface of the first manifold portion 105. In this manner, socket 135 is free to rotate within busing 140 and to provide for the relative rotation between the first manifold portion 105 and the second manifold 110. Furthermore, the additional use of various hardware or sealing elements, such as o-ring seal 155, may be used to implement the hinged joint as described above. Accordingly, melt is able to flow through channel 160 in an unimpeded and uninterrupted manner as the relative rotation between the manifold portions 105, 110 occurs. In preferred embodiments, the channel 160 ranges from approximately 5.0 mm to 25.0 mm in diameter. Other components and elements of the hinged joints will be sized and otherwise dimensioned to accommodate a channel bore of this diameter, while withstanding typical temperatures and pressures of injection molding operations.

Figure 9:
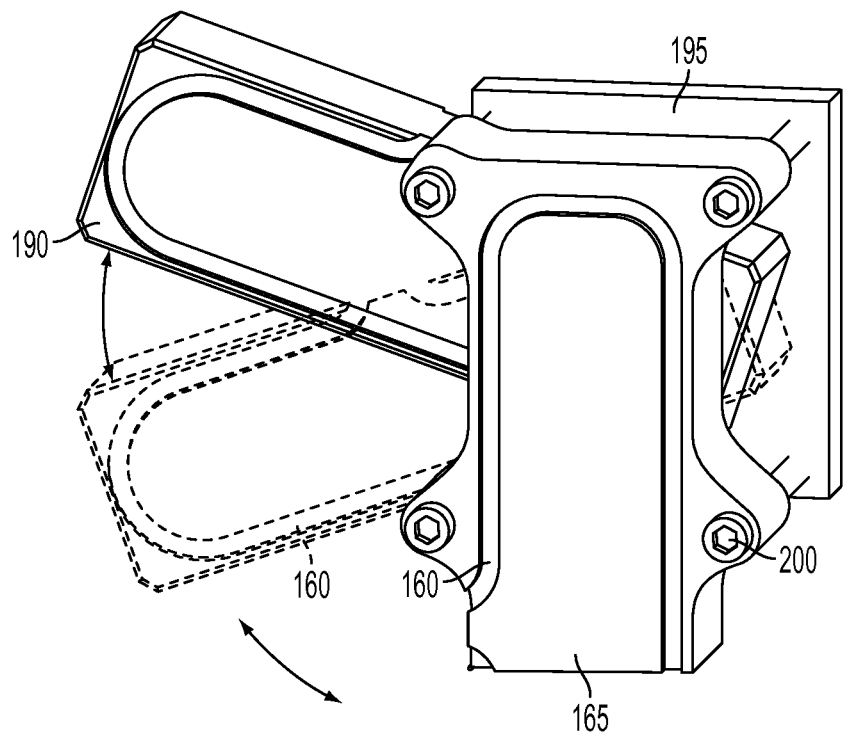
FIG. 9 is a perspective view of a hinged joint according to another embodiment of the invention.
Figure 10:
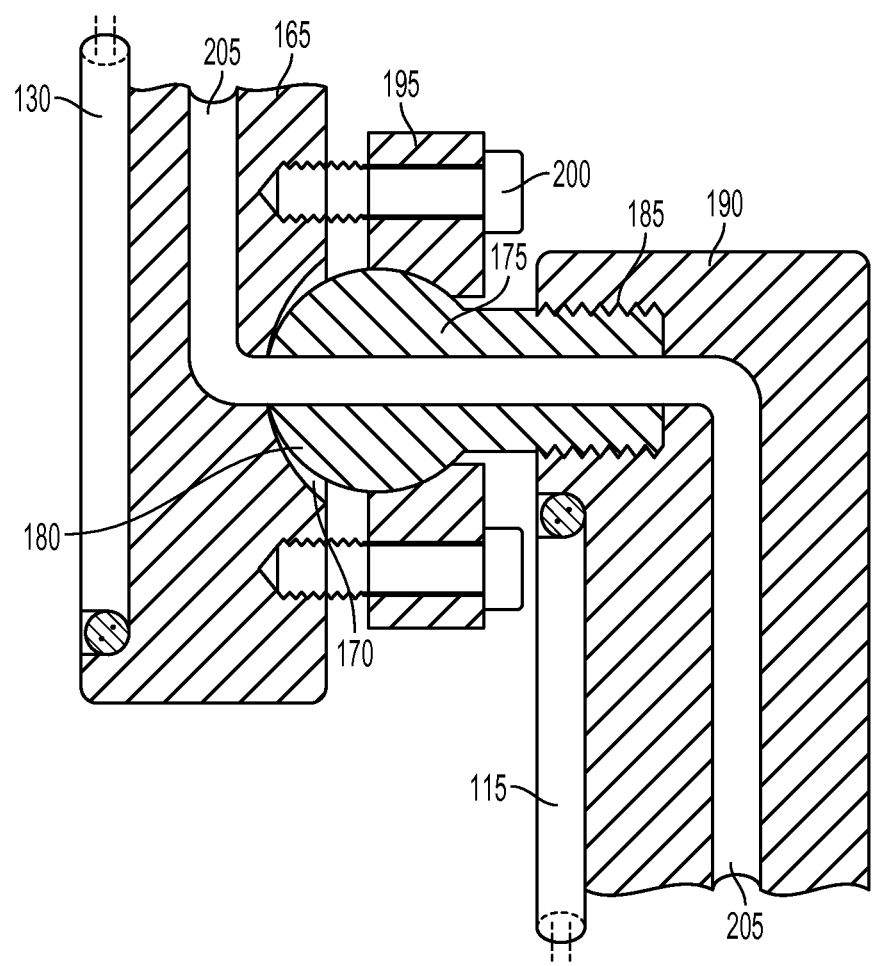
FIG. 10 is a sectional view taken along a mid-plane of the joint of FIG. 9.

Referring now to FIGS. 9 and 10, there is shown another embodiment of a hinged joint for use with the manifold of FIGS. 1 and 2. Manifold electrical heaters 115, 130 are provided as previously described with respect to FIG. 5. A first manifold portion 165, has a bearing surface 170 sized and otherwise dimensioned to receive a connector 175 having a ball bearing portion 180 and a connector portion 185, that is preferably a threaded connector portion adapted to engage a thread receiving portion of the second manifold portion 190. The connector 175 is affixed to the first manifold portion 165 by clamp plate 195 and screws 200. Preferably, screws 200 are provided to hold the assembly together and are pre-loaded to withstand the melt pressure inside the melt distribution bore 205. As illustrated, connector 175 also includes a thru-bore to allow melt to pass through, between the first manifold portion 165 and the second manifold portion 190. Accordingly, the melt distribution bore 205 extends through the first manifold portion 165, the connector 175 and the second manifold portion 190 to provide for the uninterrupted flow of melt through a hinged joint in accordance with the invention. The manifold portions 165 and 190 are able to rotate with respect to each other by way the bearing surface 170 and ball bearing portion 180 arrangement.

Figure 11:
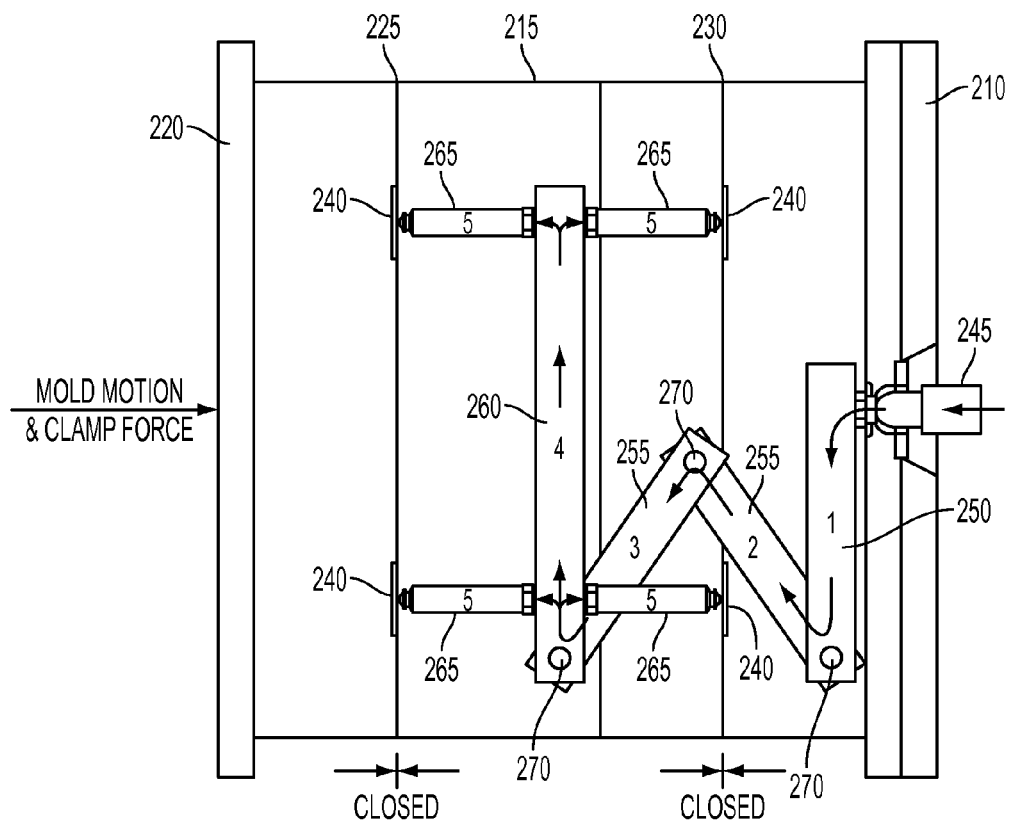
FIG. 11 is a schematic view of a stack mold in the mold closed position incorporating the melt distribution manifold according to the invention.
Figure 12:
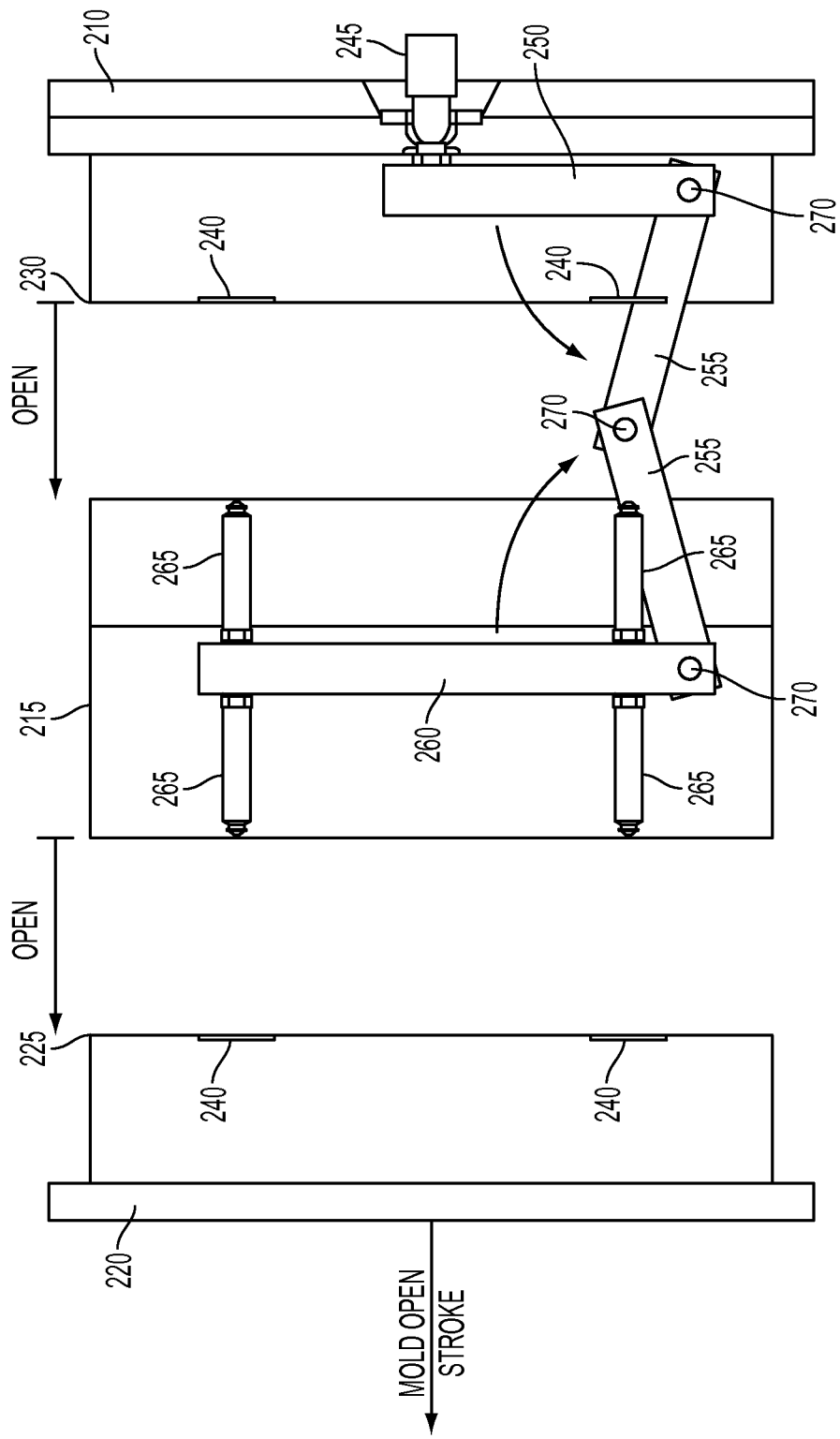
FIG. 12 is a schematic view of the stack mold of FIG. 11 in the mold open position.

As mentioned above, embodiments of the invention are equally applicable to other mold arrangements where it would be beneficial to provide for manifold sections that are moveable with respect to each other. On example is shown in FIGS. 11 and 12, where there is shown a stack mold in its mold open and mold closed positions, respectively. The stack mold includes a stationary machine platen 210, and a moving machine platen 220 around a mold centre block 215. Between the open and closed positions, the moving machine platen 220 and the mold centre block 215 separate from mold split lines 225 and 230, respectively. Hot runner nozzles 235 are adapted to inject melt into mold cavities 240. Attached to the stationary machine platen 210, proximate an interface with the injector portion 245 of an injection molding machine (not shown)

is a stationary manifold portion 250. Connected in series to the stationary manifold portion 250 are two moveable manifold portions 255 that are themselves connected to a hot runner manifold portion 260, from where melt is injected via the hot runners 265 to the mold cavities 240. The moveable manifold portions 255 are free to rotate relative to each other and relative to the stationary 250 and hot runner 260 manifold portions. Accordingly, when the stack mold is in its open position as shown in FIG. 12, the moveable manifold portions 255 permit the relative movement of the hot runner manifold portion 260 with respect to the stationary manifold portion 250, even though the hot runners 265 are themselves fixed with respect to the mold centre block 215. The various manifold portions are connected to each other by way of hinged joints 270 according to the invention. It is beneficial to provide internal manifold elements that are moveable with respect to each other such that disconnection of melt flow lines is not necessary when the manifold portions part with respect to each other. This functionality has heretofore been unknown in the prior art, without the use of intermediary valves, shut-off systems and related components that have, in the prior art, required a disconnection of the melt flow paths from each other or from the hot runners.

Figure 13:
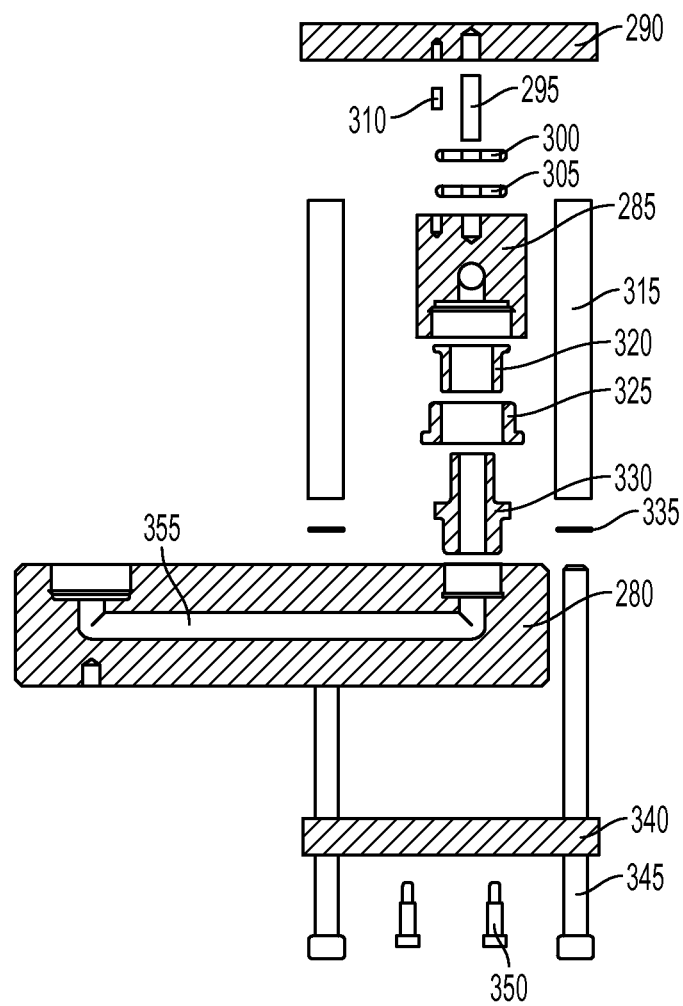
FIG. 13 is an exploded view of a hinged joint according to another embodiment of the invention.
Figure 14:
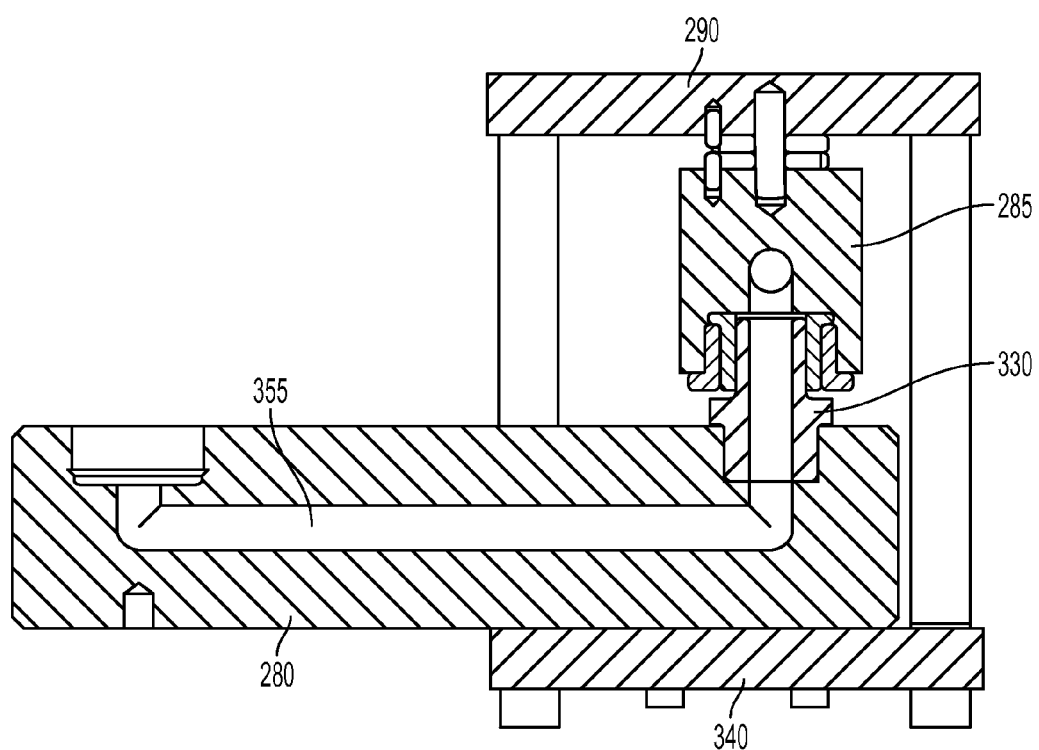
FIG. 14 is a sectional view of the hinged joint of FIG. 13

Referring to FIGS. 13 and 14, there is shown a preferred embodiment of a hinged joint that may be used with the stack mold configuration as described in the preceding paragraph, or with any other mold configurations as herein described or will be known by a person skilled in the art. First manifold portion 280 and second manifold portion 285 are adapted to under relative rotation with respect to each other. First manifold portion 280 is secured by hinge clamp plate 290 via clamp screws 350. Second manifold portion 285 is attached to the clamp plate 290 via a dowel pin 295, and a second dowel pin 310 to prevent rotation of the second manifold portion with respect to the clamp plate 290. Washers 300 and 305 are provided at an interface of the second manifold portion 285 and the clamp plate 290. In order to connect the melt flow path 355 between the manifold portions 280 and 290 while still providing for relative rotation, first and second bushings 320, 325 are provided, with the first busing 320 positioned in a counterbore in the second manifold portion 285. The second bushing 325 is able to rotate with respect to the first bushing 320. A socket 330 is attached to the first manifold portion 280 by a threaded connection as shown, with the second bushing 325 engaging the socket 330. Various spacers 315, 335 are used as illustrated to complete the assembly. Accordingly, melt is able to flow through channel 325 in an unimpeded and uninterrupted manner. The tension in the clamp screws 345 is provided such that the hinged joint is able to withstand the injection pressures necessary to prevent leakage in the system.

Figure 15:
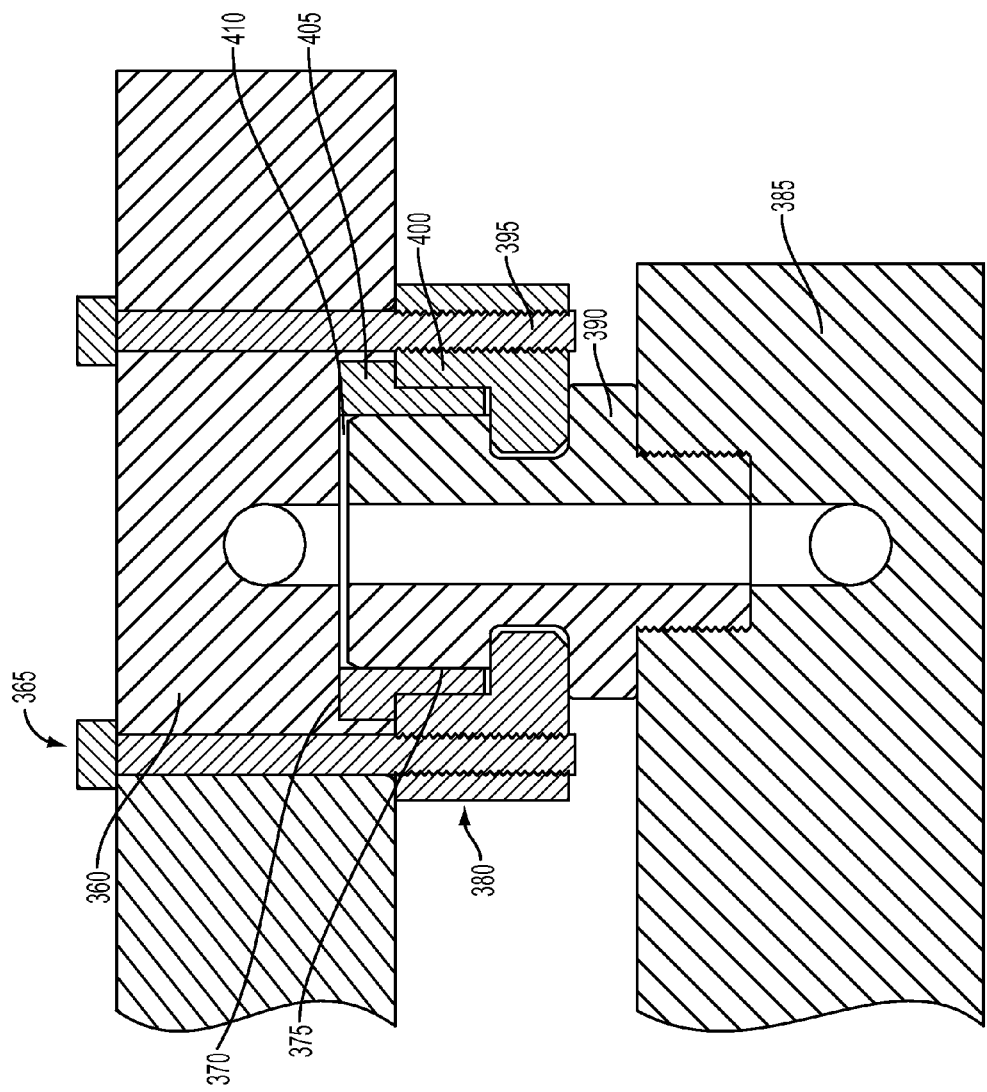
FIG. 15 is a sectional view of a hinged joint according to another embodiment of the invention.

Referring now to FIG. 15, there is another embodiment of a hinged joint according to the invention. First manifold portion 360 and second manifold portion 385 are arranged such that the second manifold portion 385 is able to rotate with respect to the first manifold portion 360 by way of a hinge socket 390 rotating within a bushing 405. Hinge socket 390 is rigidly connected to the second manifold portion 385, for example by a threaded connection. Hinge socket 390 includes an indented portion 392 for receiving a corresponding protruding portion 402 of retaining ring 400. The retaining ring 400 is rigidly connected to the first manifold portion 360, for example by way of screws 365 extending through the first manifold portion 360 and into threads on the retaining ring 400. The screws 365 thus clamp the retaining ring 400, hinge socket 390, and thus the second manifold portion 385 to the joint. Proximate the protruding portion 402 of the retaining ring 400, a bushing 405 is provided within which the hinge rocket 390 is free to rotate. A rotary cylindrical seal 375 may be provided between the bearing surface of the bushing 405 and the hinge socket 390. A heat expansion gap 410 may be provided between a surface of the hinge socket 390 distal from the second manifold portion 385 and proximate a surface of the first manifold portion 365. A melt channel thus extends from the first manifold portion 365, through the heat expansion gap 410, into the hinge socket 390 and towards the second manifold portion 385.

Figure 16A:
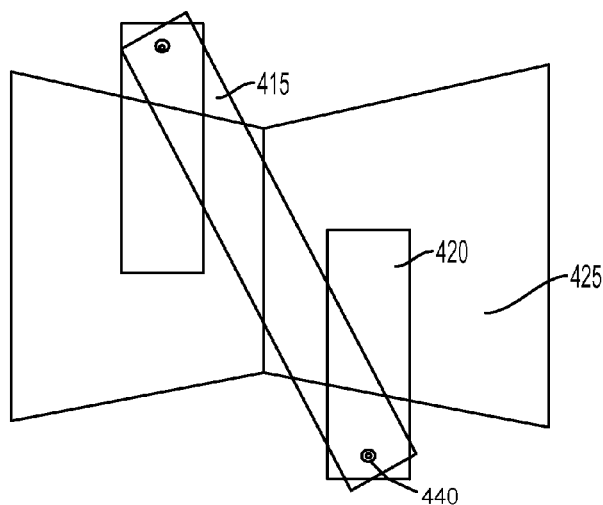
FIG. 16A is a schematic view of a slide mold arrangement in the mold closed position incorporating the melt distribution manifold according to the invention.
Figure 16B:
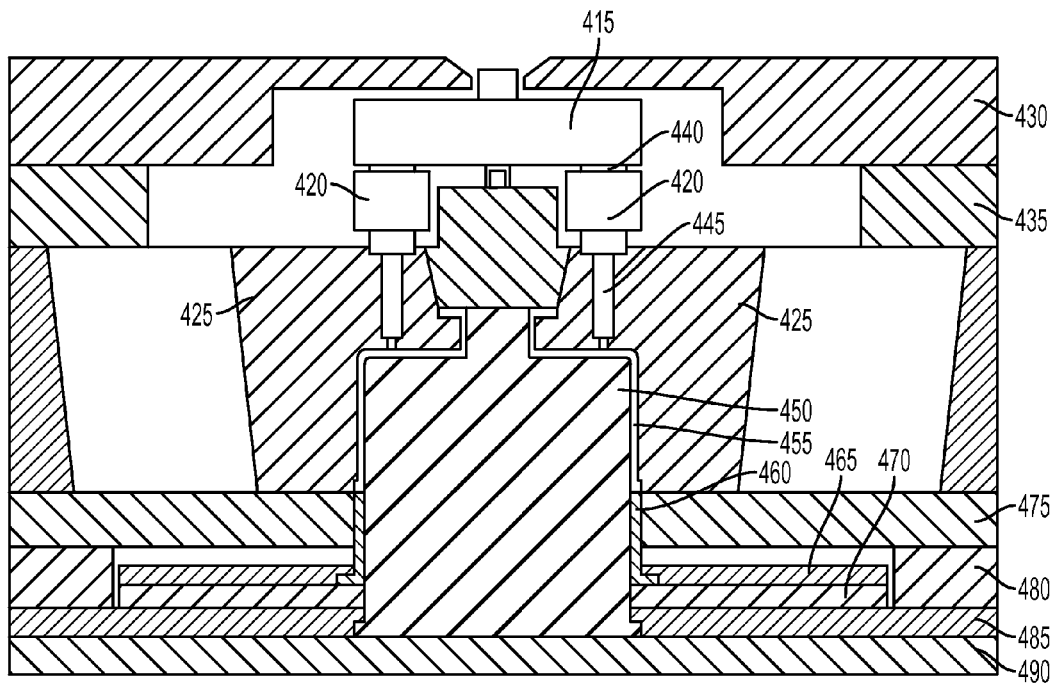
FIG. 16B is a sectional view of the slide mold of FIG. 16A
Figure 17A:
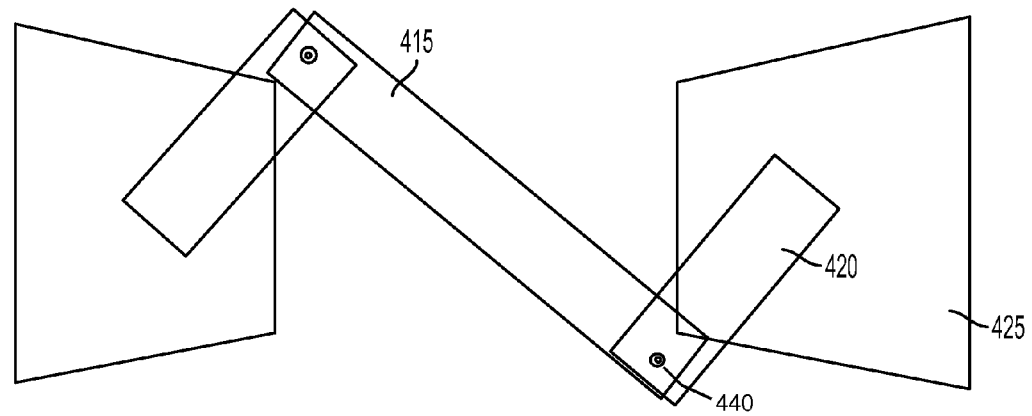
FIG. 17A is a schematic view of a slide mold arrangement in the mold open position incorporating the melt distribution manifold according to the invention.
Figure 17B:
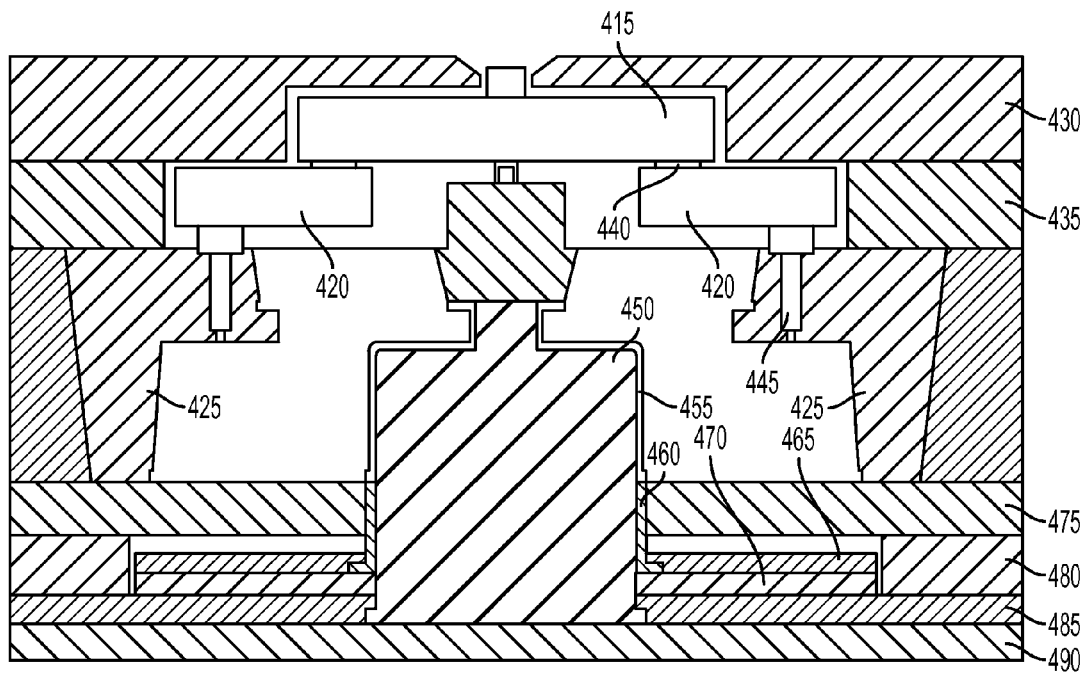
FIG. 17B is a sectional view of the slide mold of FIG. 17A.

FIGS. 16A and 16B illustrate another application of the hinged joints according to the invention, as could be applied to slide molds in the closed position. FIGS. 17A and 17B show the mold arrangement of FIGS. 16A and 16B in the mold open position. As illustrated, the mold slide 425 moves from a first position as in FIGS. 16A and 16B to a second position as in FIGS. 17A and 17B. The melt distribution manifold includes a primary portion 415, and a pair of secondary portions 420, each connected to the primary portion 415 by way of hinged joints 440 as herein described. The mold arrangement includes a top clamp plate 430 that includes a receiving portion for receiving melt from an injection molding machine into the primary manifold portion 415. A cavity plate 435 in contact with the top clamp plate 430 separates the top clamp plate 430 from the mold slides 425, thereby permitting the slides 425 to move. Mold core 450 defines the shape of a container 455 within the mold cavity. Melt flows into the primary manifold portion 415, through the hinged joints 440 and into the secondary manifold portions 420, as illustrated. Hot runner nozzles 445 receive melt from the secondary manifold portions 420 to be injected into the mold cavity to form the container 455. Also illustrated, as is generally known in the art, are a mold core plate 475, that defines the bottom surface of the mold core, an ejector sleeve 460 for ejecting the container 455, and driven by ejector plates 465 and 470. The mold ejector 480 rests on the mold core retainer plate 485 above the bottom clamp plate 490. The general operation of the mold ejector and arrangement within the mold core is known in the prior art and not described further. As will be appreciated, the hot runner nozzles 445 are fixed within the mold slides 425, and therefore, movement of the manifold portions by way of the hinged joints of the invention provides substantial benefits over prior art systems which required the use of shut-off valves and hot runner disconnect ports.

While the description has used the terms horizontal and vertical, it will be understood that these terms are used relative to each other and should be considered as limiting on the invention. That is, a mold arrangement may be laid out such that the mold opens in a horizontal direction and the slides slide in a vertical direction. Thus, the terms horizontal and vertical are merely used to define directions perpendicular to each other.

The hinged joints according to the invention are preferably selected from materials, sized and otherwise dimensioned to withstand operating conditions of injection molding processes, including the demands of cyclic operations as are generally known in the art. Typical cycle times for the mold arrangements applicable to the teachings of this invention range from three seconds for fast cycling molds up to sixty seconds for slower mold times. The manifolds and joints as herein disclosed, will in the course of their normal operation, be subjected to the elevated temperatures and pressures of injection molding melt flow. For example, when injection molding polypropylene, temperatures in the range of 220-250 degrees Celsius can be expected along with melt pressures of between 500-1500 bar. In some applications, the temperatures can range up to 400 degrees Celsius with pressures up to 2500 bar.

The scope of the claims that follow should not be limited by the preferred embodiments set forth in description of the preferred embodiments or in the examples, but should be given the broadest interpretation consistent with the description as a whole.

The invention claimed is:

1. A mold arrangement having a first mold portion and a second mold portion, wherein second mold portion is moveable with respect to said first mold portion; at least one hot runner nozzle fixed in position with respect to said second mold portion; and, a melt distribution manifold for distributing melt to said at least one hot runner nozzle, wherein said melt distribution manifold comprises:
   i. a melt inlet means for receiving melt from an injection molding machine;
   ii. a first manifold portion connected to said first mold portion, wherein said first manifold portion is stationary with respect to said first mold portion,
   iii. a second manifold portion connecting said first manifold portion to said hot runner nozzle, wherein said second manifold portion is moveable with respect to said first manifold portion such that when the first mold portion moves with respect to the second mold portion, said second manifold portion remains connected to said first manifold portion and to said hot runner nozzle;
   iv. a hinged joint connecting said first manifold portion to said second manifold portion; and,
   v. each of said first manifold portion, said second manifold portion, and said hinged joint having respective melt distribution bores in fluid communication with each other.

2. A mold arrangement according to claim 1, wherein said mold arrangement comprises one of a stack mold, a tandem mold, and a side slide mold arrangement.

3. A mold arrangement according to claim 1, further comprising additional moveable manifold portions connected in series to said second manifold portion by additional hinged joints.

4. A mold arrangement according to claim 1, wherein said hinged joint comprises a socket and bushing combination that permits said socket to rotate within said bushing; said socket attached to said first manifold portion and said bushing positioned between said socket and said second manifold portion; a clamping means for clamping said socket and said bushing between said first manifold portion and said second manifold portion.

5. A mold arrangement according to claim 4, wherein said clamping means comprises a clamp plate in contact with an outer surface of said second manifold portion; said clamp plate having means for receiving screws extending from said first manifold portion to said means for receiving to form a clamping connection.

6. A mold arrangement according to claim 4, wherein at least one of said first and second manifold portions comprises a heating element proximate said hinged joint.

7. A mold arrangement according to claim 1, wherein said hinged joint comprises a connector having a connecting portion and a ball bearing portion; a bearing surface formed on said first manifold portion sized and otherwise dimensioned for receiving said ball bearing portion; said connecting portion rigidly connected to said second manifold portion; and a clamping means for clamping said connector to said first manifold portion to restrict lateral movement of said connector with respect to said first manifold portion while permitting rotational movement of said ball bearing portion with respect to said bearing surface.

8. A mold arrangement according to claim 7, wherein at least one of said first and second manifold portions comprises a heating element proximate said hinged joint.

9. A mold arrangement according to claim 1, wherein said hinged joint comprises a first clamp plate adjacent an outer surface of said first manifold portion and a clamp plate adjacent an outer surface of said second manifold portion, wherein said first and second clamp plates are arranged to clamp said first manifold portion and said second manifold portion therebetween with a socket and bushing combination that permits said socket to rotate within said bushing; said socket attached to said first manifold portion and said bushing positioned between said socket and said second manifold portion.

10. A melt distribution manifold for use with first and second mold portions moveable with respect to each other, said melt distribution manifold comprising:
   i. a melt inlet means for receiving melt from an injection molding machine;
   ii. a first manifold portion connected to said first mold portion, wherein said first manifold portion is stationary with respect to said first mold portion,
   iii. a second manifold portion connecting said first manifold portion to said hot runner nozzle, wherein said second manifold portion is moveable with respect to said first manifold portion such that when the first mold portion moves with respect to the second mold portion, said second manifold portion remains connected to said first manifold portion and to said hot runner nozzle; and,
   iv. a hinged joint connecting said first manifold portion to said second manifold portion;
      wherein, each of said first manifold portion, said second manifold portion, and said hinged joint having respective melt distribution bores in fluid communication with each other.

11. A melt distribution manifold according to claim 10, wherein said first and second mold portions form part of one of a stack mold, a tandem mold, and a side slide melt distribution manifold.

12. A melt distribution manifold according to claim 10, further comprising additional moveable manifold portions connected in series to said second manifold portion by additional hinged joints.

13. A melt distribution manifold according to claim 10, wherein said hinged joint comprises a socket and bushing combination that permits said socket to rotate within said bushing; said socket attached to said first manifold portion and said bushing positioned between said socket and said second manifold portion; a clamping means for clamping said socket and said bushing between said first manifold portion and said second manifold portion.

14. A melt distribution manifold according to claim 13, wherein said clamping means comprises a clamp plate in contact with an outer surface of said second manifold portion; said clamp plate having means for receiving screws extending from said first manifold portion to said means for receiving to form a clamping connection.

15. A melt distribution manifold according to claim 13, wherein at least one of said first and second manifold portions comprises a heating element proximate said hinged joint.

16. A melt distribution manifold according to claim 10, wherein said hinged joint comprises a connector having a connecting portion and a ball bearing portion; a bearing surface formed on said first manifold portion sized and otherwise dimensioned for receiving said ball bearing portion; said connecting portion rigidly connected to said second manifold portion; and clamping means for clamping said connector to said first manifold portion to restrict lateral movement of said connector with respect to said first manifold portion while permitting rotational movement of said ball bearing portion with respect to said bearing surface.

17. A melt distribution manifold according to claim 16, wherein at least one of said first and second manifold portions comprises a heating element proximate said hinged joint.

18. A melt distribution manifold according to claim 10, wherein said hinged joint comprises a first clamp plate adjacent an outer surface of said first manifold portion and a clamp plate adjacent an outer surface of said second manifold portion, wherein said first and second clamp plates are arranged to clamp said first manifold portion and said second manifold portion therebetween with a socket and bushing combination that permits said socket to rotate within said bushing; said socket attached to said first manifold portion and said bushing positioned between said socket and said second manifold portion.

\* \* \* \* \*